(12) United States Patent
Choi et al.

(10) Patent No.: US 9,596,102 B2
(45) Date of Patent: Mar. 14, 2017

(54) COMPUTING SYSTEM WITH CHANNEL ESTIMATION MECHANISM AND METHOD OF OPERATION THEREOF

(71) Applicant: Samsung Electronics Co., Ltd., Suwon-si, Gyeonggi-Do (KR)

(72) Inventors: Yoo Jin Choi, San Diego, CA (US); Jung Hyun Bae, San Diego, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/553,917

(22) Filed: Nov. 25, 2014

(65) Prior Publication Data

US 2016/0080174 A1 Mar. 17, 2016

Related U.S. Application Data

(60) Provisional application No. 62/050,879, filed on Sep. 16, 2014.

(51) Int. Cl.
*H04L 25/02* (2006.01)
*H04L 5/00* (2006.01)
*H04L 27/26* (2006.01)

(52) U.S. Cl.
CPC .......... *H04L 25/022* (2013.01); *H04L 25/021* (2013.01); *H04L 5/0051* (2013.01); *H04L 27/2613* (2013.01); *H04L 27/2647* (2013.01)

(58) Field of Classification Search
CPC ............. H04L 25/0212; H04L 25/0232; H04L 25/0242; H04L 25/021; H04L 25/022; H04L 27/2613; H04L 27/2647; H04L 5/0051
See application file for complete search history.

(56) References Cited

U.S. PATENT DOCUMENTS

| 8,995,589 | B1* | 3/2015 | Qiu | H03L 7/099 375/316 |
| 9,391,821 | B2* | 7/2016 | Li | H04L 5/0048 |
| 2005/0105647 | A1* | 5/2005 | Wilhelmsson | H04L 25/0234 375/316 |

(Continued)

FOREIGN PATENT DOCUMENTS

| CN | 102752259 A | 10/2012 |
| CN | 101945060 B | 11/2013 |
| KR | 20120071250 A | 7/2012 |

OTHER PUBLICATIONS

Daniel Larsson Analysis of channel estimation methods for OFDMA), Master of Science Thesis, Dec. 19, 2006, pp. 1-85.*

(Continued)

*Primary Examiner* — Sophia Vlahos
(74) *Attorney, Agent, or Firm* — IP Investment Law Group

(57) ABSTRACT

A computing system includes: an inter-device interface configured to receive receiver signal for communicating serving content through a communication channel; a communication unit, coupled to the inter-device interface, configured to: calculate a weighting set corresponding to a modular estimation mechanism, and generate a channel estimate based on the weighting set for characterizing the communication channel for recovering the serving content.

20 Claims, 4 Drawing Sheets

(56) References Cited

U.S. PATENT DOCUMENTS

| | | | |
|---|---|---|---|
| 2007/0127588 A1* | 6/2007 | Kim | H04B 7/04 375/267 |
| 2007/0201544 A1* | 8/2007 | Zhu | H04L 25/03057 375/229 |
| 2008/0117995 A1* | 5/2008 | Anderson | H04L 25/0234 375/260 |
| 2008/0144752 A1* | 6/2008 | Zhou | H04B 7/0854 375/347 |
| 2008/0219332 A1* | 9/2008 | Brehler | H03G 3/3078 375/219 |
| 2011/0293028 A1 | 12/2011 | Panicker et al. | |
| 2012/0027140 A1* | 2/2012 | Weng | H04L 25/0232 375/350 |
| 2013/0051505 A1 | 2/2013 | Singh et al. | |
| 2014/0056393 A1* | 2/2014 | Xu | H04L 25/0212 375/343 |

OTHER PUBLICATIONS

Zaknich A "Adaptive Filtering", 2005 from "Principles of Adaptive Filters and Self-learning Systems", pp. 3-23.*

A.Joy, V.K.Chakka; "Low Complexity 2D Adaptive Channel Estimation for OFDM Based Two-Way Relay Systems"; Next Generation Mobile Apps, Services and Technologies (NGWMAST), 2013 7th International Conference on, Sep. 2013.

* cited by examiner

COMPUTING SYSTEM WITH CHANNEL ESTIMATION MECHANISM AND METHOD OF OPERATION THEREOF

CROSS-REFERENCE TO RELATED APPLICATION(S)

This application claims the benefit of U.S. Provisional Patent Application Ser. No. 62/050,879 filed Sep. 16, 2014, and the subject matter thereof is incorporated herein by reference thereto.

TECHNICAL FIELD

An embodiment described herein relates generally to a computing system, and more particularly to a system with channel estimation mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a computing system with channel estimation mechanism. In view of the ever-increasing commercial competitive pressures, along with growing consumer expectations and the diminishing opportunities for meaningful product differentiation in the marketplace, addressing such issues are becoming increasingly valuable. Additionally, the need to reduce costs, improve efficiencies and performance, and meet competitive pressures adds an even greater urgency for finding answers to these problems.

Solutions to these problems have been long sought but prior developments have not taught or suggested any solutions and, thus, solutions to these problems have long eluded those skilled in the art.

SUMMARY

An embodiment described herein provides a computing system, including: an inter-device interface configured to receive receiver signal for communicating serving content through a communication channel; a communication unit, coupled to the inter-device interface, configured to: calculate a weighting set corresponding to a modular estimation mechanism, and generate a channel estimate set based on the weighting set for characterizing the communication channel for recovering the serving content.

An embodiment described herein provides a method of operation of a computing system including: receiving receiver signal for communicating serving content through a communication channel; calculating a weighting set corresponding to a modular estimation mechanism; and generating a channel estimate set with a communication unit based on the weighting set for characterizing the communication channel for recovering the serving content.

An embodiment described herein provides a non-transitory computer readable medium including instructions for operating a computing system including: receiving receiver signal for communicating serving content through a communication channel; calculating a weighting set corresponding to a modular estimation mechanism; and generating a channel estimate set with a communication unit based on the weighting set for characterizing the communication channel for recovering the serving content.

Certain embodiments have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
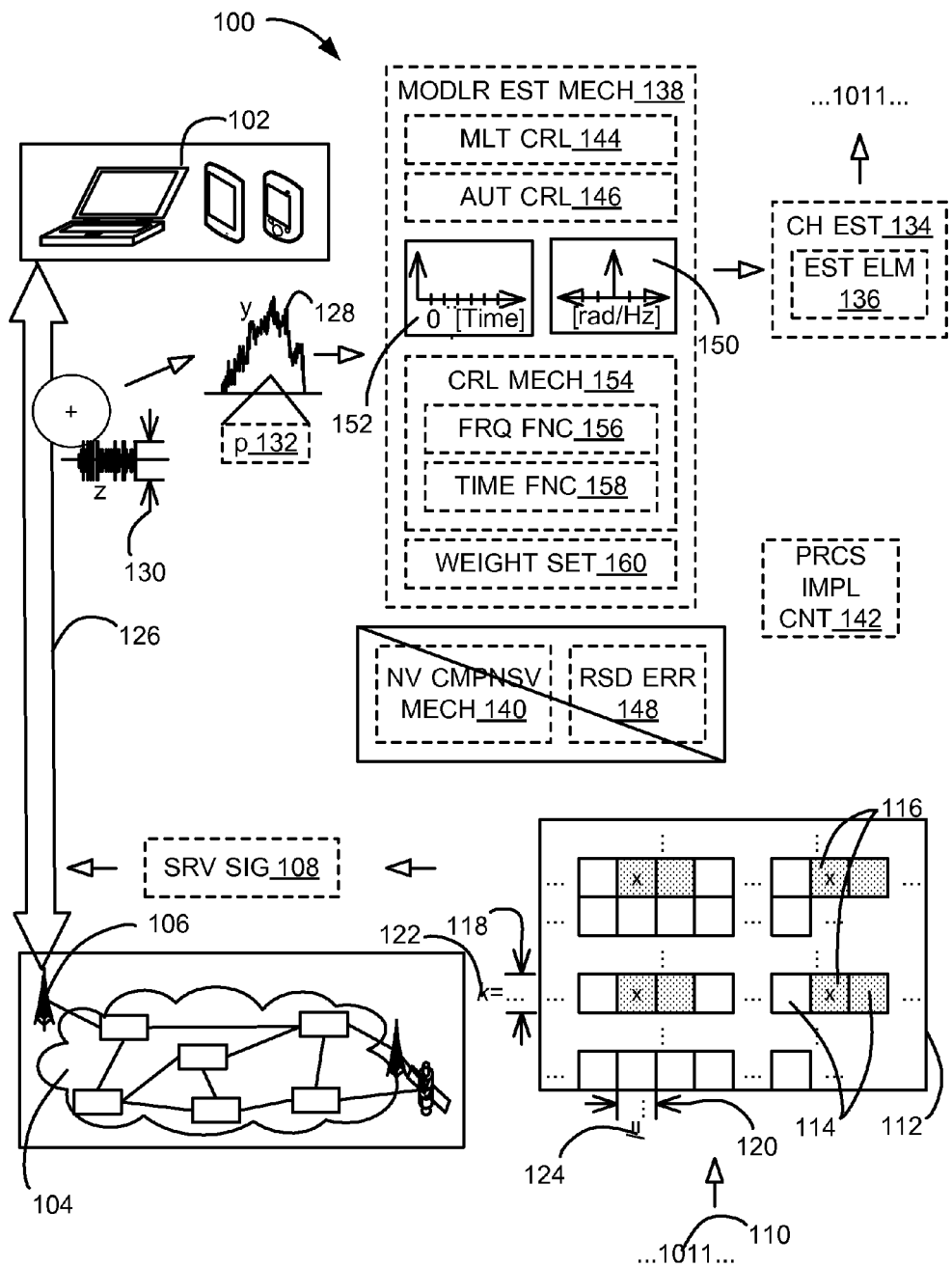
FIG. 1 is a computing system with channel estimation mechanism in an embodiment.

The following embodiments can be used to estimate effects or influences of communication channel for communicating serving content between devices. The communication channel can be estimated using a channel estimate set or an estimate element therein.

The channel estimate set can be generated using a modular estimation mechanism including a reference processing mechanism for smoothing reference portions within receiver signal, a frequency-domain mechanism for processing the smoothed instances of the reference portions in frequency domain, and a time-domain mechanism for interpolating in time domain based on result of the frequency-domain mechanism. The channel estimate set can further be generated using the modular estimation mechanism including a combining mechanism and the time-domain mechanism. The combining mechanism can combine the reference processing mechanism and the frequency-domain mechanism into a single process.

The following embodiments are described in sufficient detail to enable those skilled in the art to make and use the embodiments described herein. It is to be understood that other embodiments would be evident based on the present disclosure, and that system, process, or mechanical changes may be made without departing from the scope of an embodiment.

In the following description, numerous specific details are given to provide a thorough understanding of an embodiment. However, it will be apparent that an embodiment may be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation. The embodiments have been numbered first embodiment, second embodiment, etc. as a matter of descriptive convenience and are not intended to have any other significance or provide limitations for an embodiment.

The term "module" referred to herein can include or be implemented as software, hardware, or a combination thereof in an embodiment described herein in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a computing system 100 with channel estimation mechanism in an embodiment. The computing system 100 includes a first device 102, such as a mobile device including a cellular phone or a notebook computer, connected to a network 104. The first device 102 can further include a wired device, such as a modem or a router. The first device 102 can further include a circuit or a device within a comprehensive device. The first device 102 can include a user equipment (UE).

The network 104 is a system of wired or wireless communication devices or means that are connected to each other for enabling communication between devices. For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks. Also for example, the network 104 can include a communication bus, a wire, a cable, a wireless connection, or a combination thereof between units within a device.

The computing system 100 can include a second device 106 for directly or indirectly linking and communicating with the first device 102. The network 104 can include or couple to the second device 106. The second device 106 can receive signals from the first device 102, transmit signals to the first device 102, process signals, or a combination thereof. The second device 106 can also relay signals between other base stations, components within the network 104, or a combination thereof.

The first device 102 can be connected to the network 104 through the second device 106. For example, the second device 106 can be a coordinating device or a controlling device for communication in the computing system 100, a base station, an evolved node B (eNodeB), a server, a router, a modem, or a combination thereof. Also for example, the second device 106 can be a communication device or a processing component included or with a cell tower, a wireless router, an antenna, or a combination thereof being used to communicate with, such as by sending signals to or receiving signals from, the first device 102 including a mobile computing device.

The first device 102 can connect to and communicate with other devices, such as other mobile devices, servers, computers, telephones, or a combination thereof. For example, the first device 102 can communicate with other devices by transmitting signals, receiving signals, processing signals, or a combination thereof and displaying content of the signals, audibly recreating sounds according to the content of the signals, processing according to the content, such as storing an application or updating an operating system, or a combination thereof.

The second device 106 can be used to wirelessly exchange signals for communication, including voice signals of a telephone call or data representing a webpage and interactions therewith. The second device 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a header portion, a format portion, an error correction or detection portion, or a combination thereof imbedded in the communicated information. The header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The computing system 100 can communicate serving signal 108 for communicating serving content 110 between devices. The serving content 110 can include information or data intended for communication between devices.

For example, the serving content 110 can be information intended for communication between the first device 102 and the second device 106. As a more specific example, the serving content 108 can include information or data to be executed or implemented at an intended receiving device, communicated through the intended receiving device, or a combination thereof, such as voice signals, images, instructions, program data, execution steps, or a combination thereof.

The computing system 100 can process the serving content 110 for communication to generate the serving signal 108. The computing system 100 can use the first device 102, the second device 106, or a combination thereof to process the serving content 110 and generate the corresponding instance of the serving signal 108.

For example, the computing system 100 can process the serving content 110 by encoding the serving content 110, such as according to Turbo Coding scheme or Polar Coding scheme. Also for example, the computing system 100 can generate and add error detection information, header information, format information, or a combination thereof for the serving content 110 or a derivative thereof. Also for example, the computing system 100 can generate one or a sequence of symbols corresponding to the serving content 110 or a processing derivative thereof according to a modulation scheme or a modulation constellation.

The computing system 100 can process the serving content 110 according to a method, a process, a scheme, or a combination thereof predetermined by the computing system 100, a communication standard or requirement, or a combination thereof. The computing system 100 can further process the serving content 110 based on a characteristic of communication environment, a characteristic of the serving content 110, or a combination thereof.

The computing system 100 can further process the serving content 110 by grouping, organizing, structuring, or a combination thereof for the serving signal 108. For example, the computing system 100 can generate the serving signal 108 including one or more instances of a resource block 112, a resource element 114, a reference portion 116, or a combination thereof.

The resource block 112 can include a grouping or an organization for information for communicating the serving content 110 between devices. The resource block 112 can include a grouping of symbols. The resource block 112 can include a size in frequency, time, or a combination thereof. As a more specific example, the resource block 112 can have a size of 180 kilohertz (kHz) in frequency, 0.5 millisecond (ms) in time, or a combination thereof for LTE communication standard.

The resource element 114 can include a unit or a segment within the resource block 112 for communicating one instance of a unit of information. The resource element 114 can include the unit of resource allocation. Within one instance of the resource block 112, the symbols corresponding to the serving content 110 can be mapped to one or more instances of the resource element 114 in the two dimensional space of time and frequency. For example, the resource element 114 can be the unit or the segment designated for communicating one or a limited number of instances of a bit, a symbol, a code word, a portion therein, or a combination thereof. Continuing with the more specific example, the resource block 112 can include 84 instances of the resource element 114 for the LTE standard.

The reference portion 116 can include one or more instances of the resource element 114 designated for communicating known or standardized information. The reference portion 116 can include a reference signal according to the communication system 100, the communication standard, or a combination thereof. The reference portion 116 can be for normalizing signal or for use as pilot information.

The serving signal 108 can be communicated using one or more instances of a sub-carrier 118, a sub-frame 120, or a combination thereof. The sub-carrier 118 can include a unit, a division, or a grouping of frequencies within an overall range for communicating information. Each instance of the sub-carrier 118 can communicate similar or different information. The sub-frame 120 can include a unit, a division, or a slot in time within an overall range for communicating information. Each instance of the sub-frame 120 can communicate similar or different information.

Continuing with the more specific example, the resource block 112 can include 12 instances of the sub-carrier 118 within the 180 kHz, with each instance of the sub-carrier 118 including 15 kHz. The resource block 112 can further include 7 instances of the sub-frame 120 for the 0.5 ms. The resource block 112 can be for communicating 7 OFDM symbols.

The computing system 100 can utilize a carrier index 122, a frame index 124, or a combination thereof. The carrier index 122 can include a reference or a name for identifying each instance of the sub-carrier 118. The frame index 124 can include a reference or a name for identifying each instance of the sub-frame 120. The carrier index 122, the frame index 124, or a combination thereof can be for referencing the sub-carrier 118, the sub-frame 120, or a combination thereof within one instance of the resource block 112.

The computing system 100 can identify each instance of the resource element 114 utilizing a unique value of the carrier index 122, the frame index 124, or a combination thereof. The computing system 100 can include the resource block 112 with the reference portion 116 at designated values or instances of the carrier index 122, the frame index 124, or a combination thereof according to the computing system 100, the communication standard, first device 102, the second device 106, or a combination thereof.

The serving signal 108 can traverse through communication channel 126 and be received as receiver signal 128. The communication channel 126 can include environments or connections between devices exchanging signals.

The communication channel 126 can each include be a direct link between corresponding devices, such as between the UE and the base station. The communication channel 126 can correspond to signals intended for exchange between corresponding devices, such as between the first device 102 and the second device 106.

The communication channel 126 can include repeaters, amplifiers, or a combination thereof there-between for an indirect link. The communication channel 126 can further include a specific instance or parameter of communication detail, such as frequency, time slot, packet designation, transmission rate, channel code, or a combination thereof used for transmitting signals between intended devices.

The communication channel 126 can further include physical characteristics unique to geographic locations associated with the corresponding devices. The communication channel 126 can include structures or influences, such as fading characteristics of signals or causes for unique delay or reflection of signals, affecting the transmission of wireless signals. The communication channel 126 can further include signals from other sources interfering with the communication of the serving signal 108. The communication channel 126 can distort or alter the signals traversing therein.

The receiver signal 128 can include information perceived or received at a receiving device. The receiver signal 128 can include information detected or identified at the receiving device. The receiver signal 128 can correspond to the serving signal 108. The receiver signal 128 can be the information corresponding to the serving signal 108 received at the intended device. The receiver signal 128 can be represented as 'y'.

The receiver signal 128 can include components or portions corresponding to the serving signal 108. For example, the receiver signal 128 can include components or portions corresponding to the resource block 112, the resource element 114, the reference portion 116, or a combination thereof. Also for example, the receiver signal 128 can include components or portions corresponding to the sub-carrier 118, the sub-frame 120, or a combination thereof. The computing system 100 can utilize the carrier index 122, the frame index 124, or a combination thereof to process the receiver signal 128.

The receiver signal 128 can include a noise component. The noise component can include errors, influences, changes, or a combination thereof affecting accuracy of the data. The noise component can include additive Gaussian white noise (AGWN) or variations based on Rayleigh distribution. The noise component can further include inaccuracies, hardware limitations, or a combination thereof from the transmitting device or the second device 106, the receiving device or the first device 102, the communication channel 126, the network 104, or a combination thereof.

The noise component can be represented as 'z'. The noise component can include a noise measure 130. The noise measure 130 can include a characteristic or a trait of the noise component. The noise measure 130 can include a statistical description or representation of the noise component. For example, the noise measure 130 can include a covariance or a standard deviation for the noise component of the receiver signal 128.

The noise measure 130 can be represented as '$\sigma^2 I$' or '$\sigma^2$'. The term 'I' can represent an identity matrix with a size or a dimension corresponding to the receiver signal 128 or a portion therein.

The receiver signal 128 can further include a channel output portion 132. The channel output portion 132 can be the information corresponding directly to the reference portion 116 of the serving signal 108. The channel output portion 132 can include a segment or a component of the receiver signal 128 directly associated with the reference portion 116 of the serving signal 108. The channel output portion 132 can include the segment or the component of the receiver signal 128 corresponding to the reference portion 116 and excluding the noise component, excluding an interference component, or a combination thereof independent of the serving signal 108.

The channel output portion 132 can further include a result of the reference portion 116 of the serving signal 108 after being affected or influenced by the communication channel 126. The channel output portion 132 can be represented as 'p'. Similarly, the receiver signal 128 or a portion or the segment of the receiver signal 128 corresponding to the reference portion 116 can be represented using channel output portion 132 and the noise component as:

$$y=p+z. \qquad \text{Equation (1).}$$

The channel output portion 132 can include the serving signal 108 and a channel estimate 134 including one or more instance of estimate element 136. The estimate element 136 is a description or a representation of the influence or the alteration caused by the communication channel 126 for a specific portion of the serving signal 108.

The estimate element 136 can correspond to an instance of the sub-carrier 118, an instance of the sub-frame 120, or a combination thereof. The estimate element 136 can be referenced by the carrier index 122, the frame index 124, or a combination thereof. For example, the estimate element 136 can be represented as '$\hat{h}_{k,l}$' according to the carrier index 122 and the frame index 124. Similarly, the receiver signal 128 can be further represented as:

$$y=hx+z. \qquad \text{Equation (2).}$$

The channel estimate 134 is an overall description or an overall representation of the influence of the alteration caused by the communication channel 126 for the serving signal 108 overall. The channel estimate 134 can include one or more instances of the estimate element 136 corresponding to each of the portions in the serving signal 108.

For example, the estimate element 136 can include the description or the representation corresponding to the resource element 114 or the reference portion 116. The channel estimate 134 can include the description or the representation corresponding to one or more instances of the resource block 112 including one or more instances of the resource element 114, the reference portion 116, or a combination thereof.

For illustrative purposes, the computing system 100 is described as the first device 102 being a UE receiving the receiver signal 128 corresponding to the serving signal 108 transmitted by the second device 106 intended for the first device 102. However, it is understood that the first device 102 can also transmit information and the second device 106 can also receive signals. It is also understood that the first device 102 can include a planning device, a base station, or a combination thereof. It is also understood that the second device 106 can include a UE.

The computing system 100 can generate the channel estimate 134, the estimate element 136, or a combination thereof based on the receiver signal 128. The computing system 100 can use the channel estimate 134, the estimate element 136, or a combination thereof to further process the receiver signal 128 and recover the serving content 110 originally intended for communication. The computing system 100 can further use the channel estimate 134, the estimate element 136, or a combination thereof for feedback information, for controlling or modifying control parameters or processing mechanisms, or a combination thereof.

The computing system 100 can generate the channel estimate 134 using a modular estimation mechanism 138 or a naïve-comprehensive mechanism 140. The computing system 100 can use the modular estimation mechanism 138 instead of or in place of the naïve-comprehensive mechanism 140.

The naïve-comprehensive mechanism 140 is a method or a process utilized for comprehensively generating the channel estimate 134. The naïve-comprehensive mechanism 140 can implement the method or the process as one grouping for process implementation count 142 representing groupings or organization of functions or results required for generating the channel estimate. The naïve-comprehensive mechanism 140 can be for implementing:

$$\hat{h}_{k,l}=R_{h_{k,l}p}(R_{pp}+\sigma^2 I)^{-1}y. \qquad \text{Equation (3).}$$

The modular estimation mechanism 138 is a method or a process utilized for generating the channel estimate 134 using distinctive segments or groupings within the method or the process. The modular estimation mechanism 138 can assume that channel correlation can be represented by the product of time and frequency dependent terms. The modular estimation mechanism 138 can correspond to the process implementation count 142 of two or more. For example, the modular estimation mechanism 138 can be for implementing Equation (3) using two, three, or more instances of segments or groups performing separate functions, methods, processes, or a combination thereof.

The modular estimation mechanism 138 can include implementation for multi-correlation result 144, auto-correlation result 146, or a combination thereof. The multi-correlation result 144 can represent a relationship between actual effect from the communication channel 126 and the received information. The multi-correlation result 144 can be represented as '$R_{h_{k,l}p}$'.

For example, the multi-correlation result 144 can represent the relationship between the actual effect or distortion caused by the communication channel 126 and the channel output portion 132. Also for example, the multi-correlation result 144 can be based on mathematical correlation between the actual effect or distortion caused by the communication channel 126 for the resource element 114 for a specific instance of the carrier index 122 and the frame index 124, represented as '$h_{k,l}$', and the channel output portion 132, represented as 'p'.

The auto-correlation result 146 can represent a relationship or a pattern within the received information relevant to estimating the communication channel 126. The auto-correlation result 146 can be the relationship or the pattern within the channel output portion 132. The auto-correlation result 146 can be based on mathematical auto-correlation for the channel output portion 132. The auto-correlation result 146 can be represented as '$R_{pp}$'.

The modular estimation mechanism 138 can be for implementing minimum-mean-square-error (MMSE) estimation scheme or linear MMSE (LMMSE) estimation scheme. The modular estimation mechanism 138 can implement MMSE or LMMSE using second order statistics of the communication channel 126. The modular estimation mechanism 138 can utilize the second order statistics and minimize the mean-square-error (MSE) within estimations for the effects or changes caused by the communication channel 126.

The modular estimation mechanism 138 can further generate the channel estimate 134 without utilizing residual error 148. The residual error 148 is an error in estimating the effects or changes caused by the communication channel 126. The residual error 148 can correspond to one or more instances of the resource element 114, as referenced by the carrier index 122 and the frame index 124. The residual error 148 can be represented as '$e_{k,l}$'.

Outside of the modular estimation mechanism 138, the residual error 148 can be utilized. The residual error 148 can be based on:

$$\sigma_e^2 = \frac{1}{N} \sum_{k=0}^{N-1} E[e_{k,l_1} e^*_{k,l_1}].$$
Equation (4)

The computing system 100 and the modular estimation mechanism 138 can generate the channel estimate 134 without estimating and without utilizing the residual error 148. The modular estimation mechanism 138 can utilize the noise measure 130 without the further processing required for the residual error 148.

The modular estimation mechanism 138 can include processing information in a frequency domain 150, a time domain 152, or a combination thereof. The two-dimensional aspect of the modular estimation mechanism 138 can correspond to the frequency domain 150 and the time domain 152 each corresponding to one of the two dimensions.

The frequency domain 150 can include a particular area or system of representation for information associated with frequency. For example, the computing system 100 can represent a signal by the frequency components therein, a magnitude or an amount of effect thereof, or a combination thereof in the frequency domain 150.

The time domain 152 can include a particular area or system of representation for information associated with time. For example, the computing system 100 can represent a signal by magnitudes and timing, a specific time, a relative comparison, or a combination thereof associated with detection of the magnitude.

The computing system 100 can use the modular estimation mechanism 138 based on a correlation mechanism 154. The correlation mechanism 154 is a method or a process for calculating a relationship between different sets of data or for calculating a pattern or a relationship within a set of data. The correlation mechanism 154 can be for calculating the mathematical correlation or the mathematical auto-correlation. The correlation mechanism 154 can include a frequency-correlation function 156, a time-correlation function 158, or a combination thereof.

The frequency-correlation function 156 is a method or a process for calculating a relationship between different sets of data in the frequency domain 150 or for calculating a pattern or a relationship within a set of data in the frequency domain 150. The frequency-correlation function 156 can analyze or process the data existing in or corresponding to the frequency domain 150, analyze or process in the frequency domain 150, or a combination thereof. The frequency-correlation function 156 can be represented as '$r_f(\bullet)$'.

The time-correlation function 158 is a method or a process for calculating a relationship between different sets of data in the time domain 152 or for calculating a pattern or a relationship within a set of data in the time domain 152. The time-correlation function 158 can analyze or process the data existing in or corresponding to the time domain 152, analyze or process in the time domain 152, or a combination thereof. The time-correlation function 158 can be represented as '$r_t(\bullet)$'.

The computing system 100 can utilize the modular estimation mechanism 138 based on the correlation mechanism 154 including the frequency-correlation function 156, the time-correlation function 158, or a combination thereof. For example, the computing system 100 can implement Equation (3) using the frequency-correlation function 156, the time-correlation function 158, or a combination thereof.

As a more specific example, the computing system 100 can assume Wide-Sense Stationary Uncorrelated Scattering (WSSUS) channel model for generating the channel estimate 134. The correlation between the effect or the alteration caused by the communication channel 126 for two different instances of the resource element 114 can be represented as:

$$R_{h_{i,j}h_{k,l}} = E[h_{i,j} k^*_{k,l}] = r_f(i-k) r_t(j-l).$$
Equation (5).

The correlation across the effects or the changes of the communication channel 126 for the two different instances of the resource element 114 can be represented as '$R_{h_{i,j}h_{k,l}}$', and the two different instances effects or the changes can be represented as '$h_{i,j}$' and '$h_{k,l}$'. The terms 'i' and 'k' and be two different values or instances of the carrier index 122 and the terms 'j' and 'l' can be two different values or instances of the frame index 124.

The computing system 100 can use the modular estimation mechanism 138 to calculate a weighting set 160 in generating the channel estimate 134. The weighting set 160 is a group of parameters for implementing each distinct process grouping or segmentations corresponding to the channel output portion 132.

For example the weighting set 160 can include two or more distinct parameters or sets thereof for the modular estimation mechanism 138. The weighting set 160 can include a group of values or value sets, such as a scalar, a calculation or processing result, a matrix or an array, or a combination thereof each corresponding to one of the distinct process grouping or segmentations within the modular estimation mechanism 138.

The computing system 100 can implement the various mechanisms described above in various ways. For example, the computing system 100 can implement the modular estimation mechanism 138, the correlation mechanism 154, or a combination thereof using hardware, software, firmware, or a combination thereof. As a more specific example, the various mechanisms can be implemented using circuits, active or passive, gates, arrays, feedback loops, feed-forward loops, hardware connections, functions or function calls, instructions, equations, data manipulations, structures, addresses, or a combination thereof.

For illustrative purposes, the computing system 100 is described as the base station communicating information to the mobile device, such as the base station transmitting and the mobile device receiving the information. However, it is understood that the mobile device can communicate directly to each other or to the base station.

Figure 2:
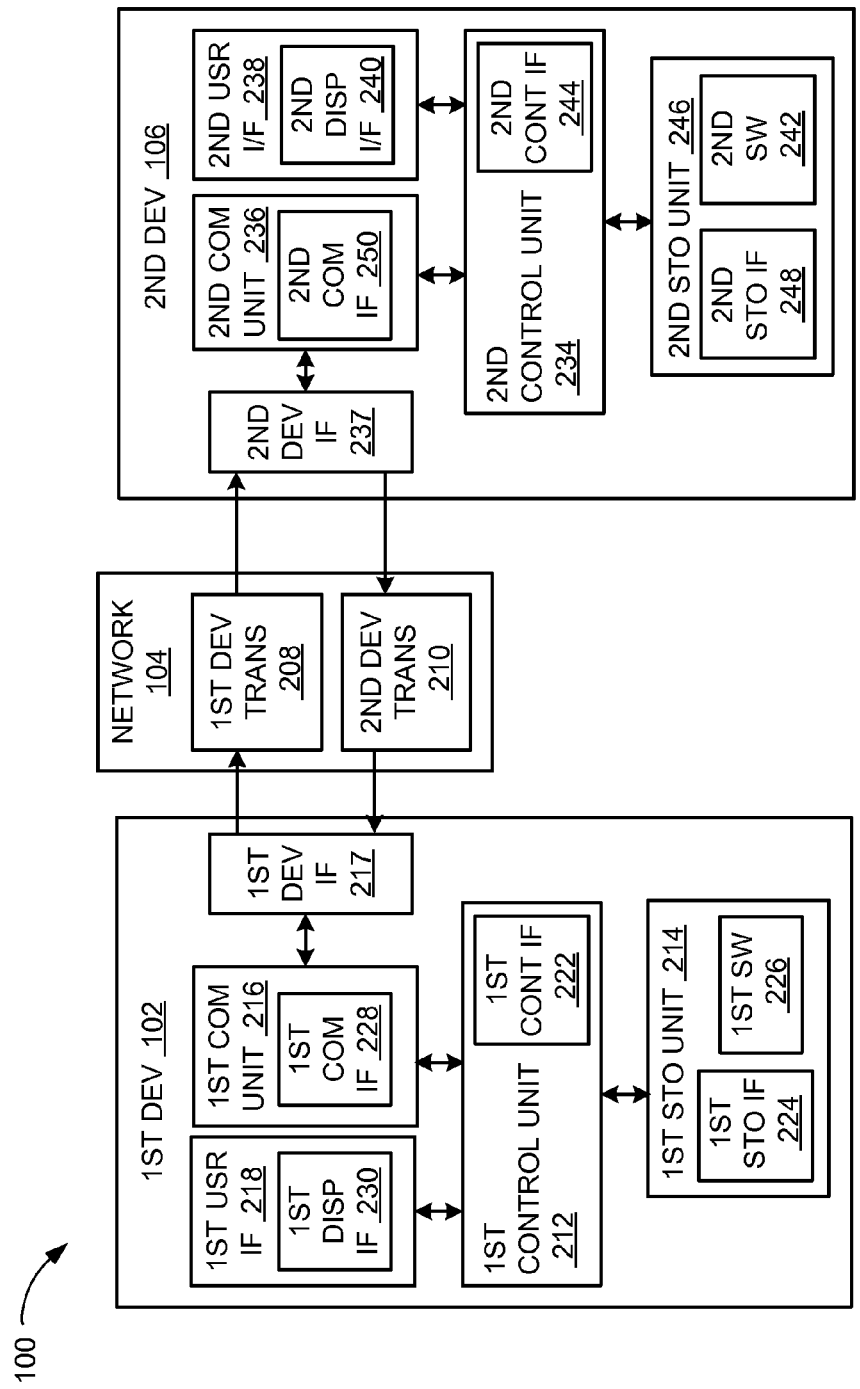
FIG. 2 is an exemplary block diagram of the computing system.

Referring now to FIG. 2, therein is shown an exemplary block diagram of the computing system 100. The computing system 100 can include the first device 102, the network 104, and the second device 106. The first device 102 can send information in a first device transmission 208 over the network 104 to the second device 106. The second device 106 can send information in a second device transmission 210 over the network 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the computing system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage unit 214 can include a first storage interface 224. The first storage interface 224 can be used for communication between the first storage unit 214 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106, a different device, an attachment, such as a peripheral device or a desktop computer, the network 104, or a combination thereof.

The first communication unit 216 can also function as a communication hub allowing the first device 102 to function as part of the network 104 and not limited to be an end point or terminal unit to the network 104. The first communication unit 216 can include active and passive components, such as microelectronics or an antenna, for interaction with the network 104.

The first communication unit 216 can include a baseband device or component, a modem, a digital signal processor, or a combination thereof for transmitting, formatting, receiving, detecting, decoding, further processing, or a combination thereof for communication signals. The first communication unit 216 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 216 can further include one or more portions for storing information, such as cache or RAM memory, registers, or a combination thereof.

The first communication unit 216 can be coupled with a first inter-device interface 217. The first inter-device interface 217 can be a device or a portion of a device for physically communicating signals with a separate device. The first inter-device interface 217 can communicate by transmitting or receiving signals to or from another device. The first inter-device interface 217 can include one or more antennas for wireless signals, a physical connection and receiver-transmitter for wired signals, or a combination thereof. The first inter-device interface 217 can include an omnidirectional antenna, a wire, an antenna chip, a ceramic antenna, or a combination thereof. The first inter-device interface 217 can further include a port, a wire, a repeater, a connector, a filter, a sensor, or a combination thereof.

The first inter-device interface 217 can detect or respond to a power in electromagnetic waves and provide the detected result to the first communication unit 216 to receive a signal, including the second device transmission 210. The first inter-device interface 217 can provide a path or respond to currents or voltages provided by the first communication unit 216 to transmit a signal, including the first device transmission 208.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include an output device. The first display interface 230 can include a display, a projector, a video screen, a speaker, or any combination thereof.

The first control unit 212 can operate the first user interface 218 to display information generated by the computing system 100. The first control unit 212 can also execute the first software 226 for the other functions of the computing system 100. The first control unit 212 can further execute the first software 226 for interaction with the network 104 via the first communication unit 216.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, a second user interface 238, and a second storage unit 246.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the computing system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the computing system 100, including operating the second communication unit 236 to communicate with the first device 102 over the network 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second control interface 244. The second control interface 244 can be used for communication between the second control unit 234 and other functional units in the second device 106. The second control interface 244 can also be used for communication that is external to the second device 106.

The second control interface 244 can receive information from the other functional units or from external sources, or can transmit information to the other functional units or to external destinations. The external sources and the external destinations refer to sources and destinations external to the second device 106.

The second control interface 244 can be implemented in different ways and can include different implementations depending on which functional units or external units are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the information such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the computing system 100 is shown with the second storage unit 246 as a single hierarchy storage system, although it is understood that the computing system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between the second storage unit 246 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second control interface 244.

The second communication unit 236 can enable external communication to and from the second device 106. For example, the second communication unit 236 can permit the second device 106 to communicate with the first device 102 over the network 104.

The second communication unit 236 can also function as a communication hub allowing the second device 106 to function as part of the network 104 and not limited to be an end point or terminal unit to the network 104. The second communication unit 236 can include active and passive components, such as microelectronics or resistors, for interaction with the network 104.

The second communication unit 236 can include a baseband device or component, a modem, a digital signal processor, or a combination thereof for transmitting, formatting, receiving, detecting, decoding, further processing, or a combination thereof for communication signals. The second communication unit 236 can include one or more portions for processing the voltages, the currents, the digital information, or a combination thereof, such as an analog-to-digital converter, a digital-to-analog converter, a filter, an amplifier, a processor-type circuitry, or a combination thereof. The second communication unit 236 can further include one or more portions for storing information, such as cache or RAM memory, registers, or a combination thereof.

The second communication unit 236 can be coupled with a second inter-device interface 237. The second inter-device interface 237 can be a device or a portion of a device for physically communicating signals with a separate device. The second inter-device interface 237 can communicate by transmitting or receiving signals to or from another device. The second inter-device interface 237 can include one or more antennas for wireless signals, a physical connection and receiver-transmitter for wired signals, or a combination thereof. The second inter-device interface 237 can include an omnidirectional antenna, a wire, an antenna chip, a ceramic antenna, or a combination thereof. The second inter-device interface 237 can further include a port, a wire, a repeater, a connector, a filter, a sensor, or a combination thereof.

The second inter-device interface 237 can detect or respond to a power in electromagnetic waves and provide the detected result to the second communication unit 236 to receive a signal, including the first device transmission 208. The second inter-device interface 237 can provide a path or respond to currents or voltages provided by the second communication unit 236 to transmit a signal, including the second device transmission 210.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second control interface 244.

The first communication unit 216 can couple with the network 104 to send information to the second device 106 in the first device transmission 208. The second device 106 can receive information in the second communication unit 236 from the first device transmission 208 of the network 104.

The second communication unit 236 can couple with the network 104 to send information to the first device 102 in the second device transmission 210. The first device 102 can receive information in the first communication unit 216 from the second device transmission 210 of the network 104. The computing system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 102 and the second device 106. It is understood that the first device 102 and the second device 106 can operate any of the modules and functions of the computing system 100.

Figure 3:
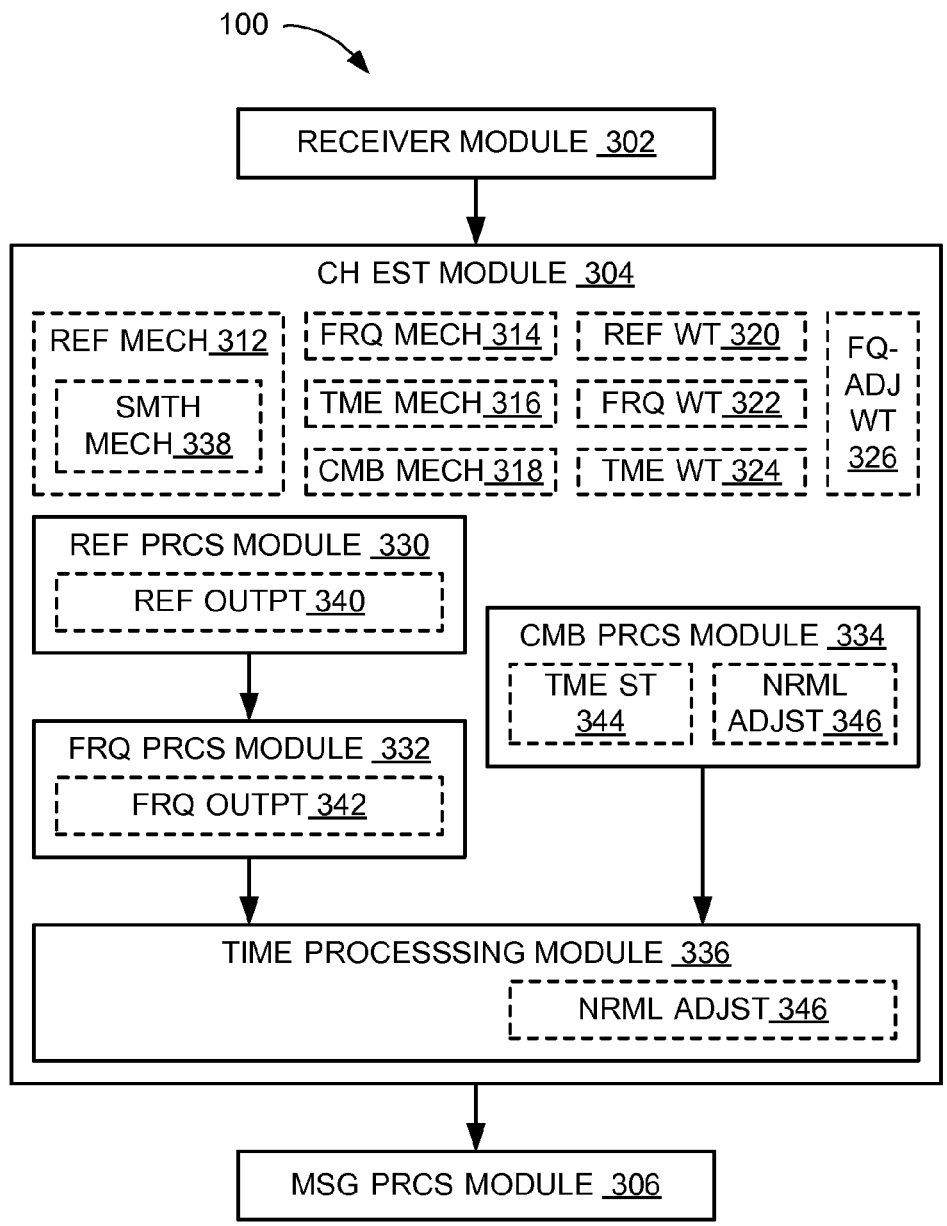
FIG. 3 is a control flow of the computing system.

Referring now to FIG. 3, therein is shown a control flow of the computing system 100. The computing system 100 can include a receiver module 302, a channel estimation module 304, a message processing module 306, or a combination thereof. The receiver module 302 can be coupled with the channel estimation module 304, which can be further coupled with the message processing module 306.

The modules can be coupled to each other in a variety of ways. For example, modules can be coupled by having the input of one module connected to the output of another, such as by using wired or wireless connections, the network 104 of FIG. 1, instructional steps, process sequence, or a combination thereof. Also for example, the modules can be coupled either directly with no intervening structure other than connection means between the directly coupled modules, or indirectly with modules or devices other than the connection means between the indirectly coupled modules.

As a more specific example, one or more inputs or outputs of the receiver module 302 can be connected to one or more inputs or outputs of the channel estimation module 304 using conductors or the communication channel without intervening modules or devices there-between for direct coupling. Also for example, the mechanism receiver module 302 can be coupled to the channel estimation module 304 indirectly using a wireless channel with a repeater, a switch, a routing device, or a combination thereof. The receiver module 302, the channel estimation module 304, the message processing module 306, or a combination thereof can be coupled in similar ways as described above.

The computing system 100 can communicate information between devices, such as by sending, transmitting, receiving, coding, decoding, or a combination thereof. The receiving device can further communicate with the user by displaying images, recreating sounds, exchanging process steps or instructions, or a combination thereof according to the information communicate to the device.

The receiver module 302 is configured to communicate the serving content 110 of FIG. 1. The receiver module 302 can communicate the serving content 110 by receiving the receiver signal 128 of FIG. 1 corresponding to or including the serving signal 108 of FIG. 1 for communicating the serving content 110 through the communication channel 126 of FIG. 1.

The receiver module 302 can receive the receiver signal 128 as the serving signal 108 having traversed the communication channel 126. The receiver module 302 can receive the receiver signal 128 as the serving signal 108 modified, altered, or changed due to the effect, influence, change, or alteration caused by the communication channel 126.

For example, the receiver module 302 can receive the receiver signal 128 including one or more portions or segments corresponding to the resource block 112 of FIG. 1, the resource element 114 of FIG. 1, the reference portion 116 of FIG. 1, or a combination thereof. Also for example, the receiver module 302 can receive the receiver signal 128 corresponding to one or more instances of the sub-carrier 118 of FIG. 1, the sub-frame 120 of FIG. 1, or a combination thereof. The receiver module 302 can receive the receiver signal 128 corresponding to the carrier index 122 of FIG. 1, the frame index 124 of FIG. 1, or a combination thereof.

As a more specific example, the receiver module 302 can receive the receiver signal 128 at the first device 102 of FIG. 1, corresponding to the serving signal 108 transmitted by the second device 106 of FIG. 1. Also as a more specific example, the receiver module 302 can receive the receiver signal 128 corresponding to multiple-input multiple-output (MIMO) communication scheme or single-input single-output (SISO) communication scheme.

The receiver module 302 can receive the receiver signal 128 by recording electrical power, voltage, current, or a combination thereof. For example, the receiver module 302 can receive the receiver signal 128 by recording energy levels or changes therein for the first inter-device interface 217 of FIG. 2, the second inter-device interface 237 of FIG. 2, the first communication interface 228 of FIG. 2, the second communication interface 250 of FIG. 2, the first control interface 222 of FIG. 2, the second control interface 244 of FIG. 2, or a combination thereof.

Also for example, the receiver module 302 can receive the receiver signal 128 by recording energy levels or changes received through a wireless antenna, a wire or a conductor, an instruction or a step for transferring data between devices, processes, instructions, between portions therein, or a combination thereof. Also for example, the receiver module 302 can record the receiver signal 128 by storing the energy levels or changes therein, according to a time, a sequence, or a combination thereof in the first communication unit 216 of FIG. 2, the second communication unit 236 of FIG. 2, the first storage unit 214 of FIG. 2, the second storage unit 246 of FIG. 2, or a combination thereof.

The receiver module 302 can process the receiver signal 128 to determine aspects thereof. For example, the receiver module 302 can determine or identify a sample size, a sample index, the resource block 112, the sub-carrier 118, the sub-frame 120, the resource element 114, the reference portion 116, the channel output portion 132 of FIG. 1, the noise component or the noise measure 130 of FIG. 1, or a combination thereof. The receiver module 302 can determine the aspects of the receiver signal 128 based on a method or a process predetermined by the computing system 100 or a standard for controlling a sampling rate, a block size, a symbol size, or a combination thereof.

As a more specific example, the receiver module 302 can utilize timing information or control parameters known or communicated to the receiving device to determine the aspects or format for the receiver signal 128. Also as a more specific example, the receiver module 302 can utilize specific transmitter or receiver antenna or the information communicated through the specific antenna, transmission frequencies, transmission timing or slots, known formats or arrangements, or a combination thereof to determine the aspects or format for the receiver signal 128.

The receiver module 302 can further use a dedicated device, circuitry, process, or a combination thereof to determine the aspects of the receiver signal 128 including the noise component, the noise measure 130, or a combination thereof. The receiver module 302 can also use known parts or aspects of the receiver signal 128 to further identify appropriate instance of the values for other aspects as predetermined and stored by the computing system 100. The receiver module 302 can further determine the noise measure 130 using a statistical analysis based on the noise component, based on values predetermined by the computing system 100, or a combination thereof.

The receiver module 302 can determine the aspects of the receiver signal 128 using the first communication unit 216, the second communication unit 236, the first control unit 212 of FIG. 2, the second control unit 234 of FIG. 2, or a combination thereof. The receiver module 302 can store the aspects of the receiver signal 128 in the first communication unit 216, the second communication unit 236, the first storage unit 214, the second storage unit 246, or a combination thereof.

After receiving the receiver signal 128 and determining the aspects thereof, the control flow can pass to the channel estimation module 304. The control flow can pass through a variety of ways. For example, control flow can pass by having processing results of one module passed to another module, such as by passing the receiver signal 128, the determined aspects thereof, or a combination thereof from the receiver module 302 to the channel estimation module 304, by storing the processing results at a location known and accessible to the other module, such as by storing the receiver signal 128, the determined aspects thereof, or a combination thereof at a storage location known and accessible to the channel estimation module 304, by notifying the other module, such as by using a flag, an interrupt, a status signal, or a combination for the channel estimation module 304, or a combination of processes thereof.

The channel estimation module 304 is configured to characterize the communication channel 126. The channel estimation module 304 can characterize by generating the channel estimate 134 of FIG. 1. The channel estimation module 304 can generate the channel estimate 134 corresponding to one or more instances of the resource block 112, the resource element 114, or a combination thereof in the receiver signal 128, the serving signal 108, or a combination thereof.

The channel estimation module 304 can use the reference portion 116 of the serving signal 108, a portion in the receiver signal 128 corresponding thereto, or a combination thereof to generate the channel estimate 134. The channel estimation module 304 can further process the receiver signal 128 with the frequency domain 150 of FIG. 1, the time domain 152 of FIG. 1, or a combination thereof.

For example, the channel estimation module 304 can compare the received instances of the receiver signal 128 or segments therein to the predetermined or known parameters for the reference portion 116. Also for example, the channel estimation module 304 can further calculate the changes in magnitude, frequency, phase, or a combination thereof in the reference portion 116 of the serving signal 108 to the receiver signal 128.

The channel estimation module 304 can use the modular estimation mechanism 138 of FIG. 1 to generate the channel estimate 134 or one or more instances of the estimate element 136 of FIG. 1 therein. The channel estimation module 304 can generate the channel estimate 134 based on the modular estimation mechanism 138 instead of or for replacing the naïve-comprehensive mechanism 140 of FIG. 1. The channel estimation module 304 can use the modular estimation mechanism 138 including a reference processing mechanism 312, a frequency-domain mechanism 314, a time-domain mechanism 316, a combining mechanism 318, or a combination thereof.

The reference processing mechanism 312 is a method or a process for manipulating the reference portion 116. The reference processing mechanism 312 can process one or more instances of the reference portion 116 in the receiver signal 128 or a portion therein corresponding to the reference portion 116. The reference processing mechanism 312 can include specific instance of the carrier index 122, the sub-frame index 124, or a combination thereof predetermined for identifying the reference portion 116 or a portion within the receiver signal 128 corresponding thereto.

The frequency-domain mechanism 314 is a method or a process analyzing the effect or characteristics of the communication channel 126 based on information, operation, or a combination thereof in the frequency domain 150. The frequency-domain mechanism 314 can include frequency-domain processing for OFDM symbols with the reference portion 116. The frequency-domain mechanism 314 can utilize the processing result from implementing the reference processing mechanism 312. The frequency-domain mechanism 314 can include correlation calculation, interpolation, or a combination thereof. The frequency-domain mechanism 314 can include the frequency-correlation function 156 of FIG. 1.

The time-domain mechanism 316 is a method or a process analyzing the effect or characteristics of the communication channel 126 based on information, operation, or a combination thereof in the time domain 152. The time-domain mechanism 316 can utilize the processing result from implementing the reference processing mechanism 312, the frequency-domain mechanism 314, or a combination thereof. The time-domain mechanism 316 can include correlation calculation, interpolation, or a combination thereof. The time-domain mechanism 316 can include the time-correlation function 158 of FIG. 1.

The combining mechanism 318 is a method or a process analyzing the effect or characteristics of the communication channel 126 based on information, operation, or a combination thereof for the reference portion 116 in the frequency domain 150. The combining mechanism 318 can include the reference processing mechanism 312 and the frequency-domain mechanism 314 combined into one grouping or the process implementation count 142 of FIG. 1 of one.

The channel estimation module 304 can further calculate and utilize the weighting set 160 of FIG. 1 corresponding to the modular estimation mechanism 138 to generate the channel estimate 134 or one or more instances of the estimate element 136 therein. The channel estimation module 304 can generate the channel estimate 134 based on the weighting set 160 for characterizing the communication channel 126 for recovering the serving content 110. The weighting set 160 can include a reference weight 320, a frequency weight 322, a time weight 324, a frequency-adjusted weight 326, or a combination thereof.

The reference weight 320 is one or a set of parameters for implementing the reference processing mechanism 312. The reference weight 320 can include a value or a value set, such as a scalar, a calculation or processing result, a matrix or an array, or a combination thereof corresponding to the reference processing mechanism 312.

The channel estimation module 304 can calculate the reference weight 320 according to the reference processing mechanism 312. The channel estimation module 304 can calculate the reference weight 320 based on the receiver signal 128, such as using the channel output portion 132, the auto-correlation result 146 of FIG. 1, the noise measure 130, or a combination thereof.

The frequency weight 322 is one or a set of parameters for implementing the frequency-domain mechanism 314. The frequency weight 322 can include a value or a value set, such as a scalar, a calculation or processing result, a matrix or an array, or a combination thereof corresponding to the frequency-domain mechanism 314.

The channel estimation module 304 can calculate the frequency weight 322 according to the frequency-domain mechanism 314. The channel estimation module 304 can calculate the frequency weight 322 based on the receiver signal 128, such as using the channel output portion 132, the multi-correlation result 144 of FIG. 1, the frequency-correlation function 156 of FIG. 1, the noise measure 130, or a combination thereof.

The time weight 324 is one or a set of parameters for implementing the time-domain mechanism 316. The time weight 324 can include a value or a value set, such as a scalar, a calculation or processing result, a matrix or an array, or a combination thereof corresponding to the time-domain mechanism 316.

The channel estimation module 304 can calculate the time weight 324 according to the time-domain mechanism 316. The channel estimation module 304 can calculate the time weight 324 based on the receiver signal 128, such as using the channel output portion 132, the time-correlation function 158 of FIG. 1, the noise measure 130, or a combination thereof.

The frequency-adjusted weight 326 is one or a set of parameters for implementing the combining mechanism 318. The frequency-adjusted weight 326 can include a value or a value set, such as a scalar, a calculation or processing result, a matrix or an array, or a combination thereof corresponding to the combining mechanism 318.

The channel estimation module 304 can calculate the frequency-adjusted weight 326 according to the combining mechanism 318. The channel estimation module 304 can calculate the frequency-adjusted weight 326 based on the receiver signal 128, such as using the channel output portion 132, the time-correlation function 158, the frequency-correlation function 156, the auto-correlation result 146 of FIG. 1, the multi-correlation result 144, the noise measure 130, or a combination thereof.

The channel estimation module 304 can use the modular estimation mechanism 138 to calculate the weighting set 160 corresponding to distinct process groupings or segments within the modular estimation mechanism 138. The channel estimation module 304 can utilize a reference processing module 330, a frequency processing module 332, a combination processing module 334, a time processing module 336, or a combination thereof.

The channel estimation module 304 can include the reference processing module 330, the frequency processing module 332, the combination processing module 334, the time processing module 336, or a combination thereof each corresponding to the distinct process groupings or segments within the modular estimation mechanism 138. The channel estimation module 304 can include the reference processing module 330, the frequency processing module 332, the combination processing module 334, the time processing module 336, or a combination thereof with the quantity of the sub-modules corresponding to the process implementation count 142 of FIG. 1. The channel estimation module 304 can generate the channel estimate 134 based on the modular estimation mechanism 138 including process implementation count 142 greater than one.

The channel estimation module 304 can use the reference processing module 330, the frequency processing module 332, the combination processing module 334, the time processing module 336, or a combination thereof to generate the channel estimate 134 based on the reference processing mechanism 312, the frequency-domain mechanism 314, the combining mechanism 318, the time-domain mechanism 316, or a combination thereof. The channel estimation module 304 can generate the channel estimate 134 for estimating the communication channel 126 without calculating and without utilizing the residual error 148 of FIG. 1 as described below.

The reference processing module 330 is configured to implement the reference processing mechanism 312. The reference processing module 330 can calculate, apply, or a combination thereof for the reference weight 320.

The reference processing module 330 can implement the reference processing mechanism 312 including a smoothing mechanism 338. The smoothing mechanism 338 is a method or a process for smoothing the reference portion 116. The smoothing mechanism 338 can include spectral smoothing, shaping, filtering, interpolating, or a combination thereof for the reference portion 116 of the receiver signal 128 or a portion therein corresponding to the reference portion 116.

The reference processing module 330 can calculate the reference weight 320 according to the reference processing mechanism 312. The reference processing module 330 can calculate the reference weight 320 based on the receiver signal 128. For example, the reference processing module 330 can calculate the reference weight 320 based on the auto-correlation result 146 of the channel output portion 132, the noise measure 130, or a combination thereof.

As a more specific example, the reference processing module 330 can calculate the reference weight 320 based on:

$$W_k^{RS} = (R_{pp} + \sigma^2 I)^{-1}. \quad \text{Equation (6).}$$

The reference weight 320 can be represented as '$W_k^{RS}$'. The auto-correlation result 146 for the channel output portion 132 can be represented as '$R_{pp}$'. The noise measure 130 can be represented as '$\sigma^2 I$'.

The reference processing module 330 can apply the reference weight 320 to the receiver signal 128 to calculate a reference processing output 340. The reference processing output 340 can represent a processing result of the reference processing mechanism 312 or the smoothing mechanism 338 therein. The reference processing output 340 can be based on applying the reference weight 320 according to the smoothing mechanism 338 for smoothing one or more instances of the reference portion 116.

The reference processing module 330 can calculate the reference processing output 340, implement the smoothing mechanism 338, apply the reference weight 320, or a combination thereof, based on:

$$\hat{p}^T = [\hat{p}_1^T, \hat{p}_2^T, \ldots, \hat{p}_n^T]^T = W_k^{RS} y. \quad \text{Equation (7).}$$

The reference processing output 340 can be represented as '$\hat{p}^T$'.

The reference processing output 340 can be the output result of smoothing one or more instances of the reference portion 116 in the receiver signal 128 or segments therein corresponding to the reference portion 116. The reference processing output 340 can further be based on applying, such as by combining or multiplying, the reference weight 320 to the receiver signal 128.

The reference processing module 330 can use the first communication unit 216, the second communication unit 236, the first control unit 212, the second control unit 234, or a combination thereof to implement the reference processing mechanism 312. The reference processing module 330 can store the reference weight 320, the reference processing output 340, or a combination thereof in the first communication unit 216, the second communication unit 236, the first storage unit 214, the second storage unit 246, or a combination thereof.

The frequency processing module 332 is configured to implement the frequency-domain mechanism 314. The frequency processing module 332 can calculate, apply, or a combination thereof for the frequency weight 322.

The frequency processing module 332 can implement the frequency-domain mechanism 314 including a frequency-interpolation mechanism or a frequency analysis mechanism. The frequency processing module 332 can analyze or process the frequency component or characteristic of data or signals, such as the receiver signal 128, the reference processing output 340, or a combination thereof.

The frequency-domain mechanism 314 can calculate the estimate element 136 corresponding to one or more instances of the resource element 114 according to one or more frequency range. For example, the frequency-domain mechanism 314 can calculate the estimate element 136 for one or more instance of the resource element 114 corresponding to one or more values or instances of the carrier index 122, the frame index 124, or a combination thereof based on the result of processing or smoothing one or more instances of the reference portion 116. As a more specific example, the frequency-domain mechanism 314 can calculate instances of the estimate element 136 corresponding to the same instance of the frame index 124 as the smoothed or processed instances of the reference portion 116 across various instances or values of the carrier index 122.

The frequency processing module 332 can calculate the frequency weight 322 according to the frequency-domain mechanism 314. The frequency processing module 332 can calculate the frequency weight 322 based on the receiver signal 128. For example, the frequency processing module 332 can calculate the frequency weight 322 based on the multi-correlation result 144 of the channel output portion 132, such as according to:

$$W_{k,l_i}^{FD} = R_{h_{k,l_i}p_i}. \qquad \text{Equation (7)}$$

The frequency weight 322 can be represented as '$W_{k,l_i}^{FD}$'. The term '$l_i$' can represent an 'i'th instance of the symbol in the receiver signal 128.

The multi-correlation result 144 can be calculated based on the frequency-correlation function 156. The frequency processing module 332 can calculate the multi-correlation result 144 as a frequency-only dependent terms. The frequency processing module 332 can calculate the multi-correlation result 144 as $$\cdot \begin{bmatrix} R_{h_{k,l_1}p_1} & 0 & \cdots & 0 \\ 0 & R_{h_{k,l_2}p_2} & \cdots & \vdots \\ \vdots & \vdots & \ddots & 0 \\ 0 & \cdots & 0 & R_{h_{k,l_n}p_n} \end{bmatrix},$$

The frequency processing module 332 can apply the frequency weight 322 to the receiver signal 128 to calculate a frequency-domain processing output 342. The frequency-domain processing output 342 can represent a processing result of the frequency-domain mechanism 314. The frequency-domain processing output 342 can be based on applying the frequency weight 322 according to the frequency-domain mechanism 314 for characterizing the communication channel 126 corresponding to one or more instances of the reference portion 116 in the frequency domain 150.

The frequency processing module 332 can calculate the frequency-domain processing output 342, apply the frequency weight 322, or a combination thereof, based on:

$$\hat{h}_{k,l_i} = W_{k,l_i}^{FD} \hat{p}_i^T. \qquad \text{Equation (8).}$$

The frequency-domain processing output 342 can be represented as '$\hat{h}_{k,l_i}$'. The frequency processing module 332 can calculate the frequency-domain processing output 342 subsequent to calculation for or based on the reference processing output 340. The frequency processing module 332 apply the frequency weight 322 to the reference processing output 340 to calculate the frequency-domain processing output 342 for processing in the frequency domain 150.

The frequency processing module 332 can use the first communication unit 216, the second communication unit 236, the first control unit 212, the second control unit 234, or a combination thereof to implement the frequency-domain mechanism 314. The reference processing module 330 can store the frequency weight 322, the frequency-domain processing output 342, or a combination thereof in the first communication unit 216, the second communication unit 236, the first storage unit 214, the second storage unit 246, or a combination thereof.

The combination processing module 334 is configured to implement the combining mechanism 318. The combination processing module 334 can calculate, apply, or a combination thereof for the frequency-adjusted weight 326.

The combination processing module 334 can implement the combining mechanism 318 combining the reference processing mechanism 312 and the frequency-domain mechanism 314 into a singular process. The combination processing module 334 can analyze or process the frequency component or characteristic of data or signals or the reference portion 116 therein. For example, the combination processing module 334 can smooth the reference portion 116 and analyze the frequency components with a singular process.

The combination processing module 334 can calculate the frequency-adjusted weight 326 according to the combining mechanism 318. The combination processing module 334 can calculate the frequency-adjusted weight 326 based on the receiver signal 128. For example, the combination processing module 334 can calculate the frequency-adjusted weight 326 based on the auto-correlation result 146 of the channel output portion 132, the noise measure 130, the multi-correlation result 144, the frequency-correlation function 156, a time-correlation set 344, a normalization adjustor 346, or a combination thereof.

The time-correlation set 344 is a set of values or parameters resulting from the time-correlation function 158 for the receiver signal 128. The time-correlation set 344 can be represented as '$R_t$'. The time-correlation set 344 can further include a n-by-n matrix with a result of comparing two symbols at 'i' and 'j' with the time-correlation function 158, according to '$r_t(l_i-l_j)$', as the (i,j)-th entry.

The normalization adjustor 346 is a value, a parameter, a set thereof, or a combination thereof for adjusting the calculation for the frequency-adjusted weight 326. The normalization adjustor 346 can be represented as '$(R_t+\delta^2 I)$'. The normalization adjustor 346 can be based on the time-correlation set 344.

The normalization adjustor 346 can include an arbitrary value or a set of values predetermined by the computing system 100, the first device 102, the second device 106, or a combination thereof. The arbitrary value or the set of values can be employed for controlling matrix manipulation and avoid ill-conditioned matrix inversion. The arbitrary value or the set of values can be represented as '$\delta$'.

As a more specific example, the combination processing module 334 can calculate the frequency-adjusted weight 326 based on:

$$W_k^{FD} = \qquad \text{Equation (9)}$$

$$(R_t + \delta^2 I) \begin{bmatrix} R_{h_{k,l_1}p_1} & 0 & \cdots & 0 \\ 0 & R_{h_{k,l_2}p_2} & \cdots & \vdots \\ \vdots & \vdots & \ddots & 0 \\ 0 & \cdots & 0 & R_{h_{k,l_n}p_n} \end{bmatrix} (R_{pp} + \sigma^2 I)^{-1}.$$

The frequency-adjusted weight 326 can be represented as '$W_k^{FD}$'.

The combination processing module 334 can apply the frequency-adjusted weight 326 to the receiver signal 128 to calculate the frequency-domain processing output 342. The combination processing module 334 can calculate the frequency-adjusted weight 326 based on applying the frequency-adjusted weight 326 to the receiver signal 128 for smoothing one or more instances of the reference portion 116 and processing in a frequency domain 150.

The frequency-domain processing output 342 from the combination processing module 334 can represent a processing result of the frequency-domain mechanism 314. The frequency-domain processing output 342 for the combination processing module 334 can be based on applying the frequency-adjusted weight 326 according to the combining mechanism 318 for combining the reference processing mechanism 312 and the frequency-domain mechanism 314 into the process implementation count 142 of one.

The combination processing module 334 can calculate the frequency-domain processing output 342 corresponding to the combining mechanism 318 based on:

$$[\hat{h}_{k,l_1}, \hat{h}_{k,l_2}, \ldots, \hat{h}_{k,l_n}]^T.$$ Equation (10).

The frequency-domain processing output 342 corresponding to the combining mechanism 318 can be represented as '$[\hat{h}_{k,l_1}, \hat{h}_{k,l_2}, \ldots, \hat{h}_{k,l_n}]^T$'.

The combination processing module 334 can use the first communication unit 216, the second communication unit 236, the first control unit 212, the second control unit 234, or a combination thereof to implement the combining mechanism 318. The combination processing module 334 can store the frequency-adjusted weight 326, the frequency-domain processing output 342, the normalization adjustor 346, or a combination thereof in the first communication unit 216, the second communication unit 236, the first storage unit 214, the second storage unit 246, or a combination thereof.

The channel estimation module 304 can calculate the frequency-domain processing output 342 using the reference processing module 330 first and then the frequency processing module 332. The channel estimation module 304 can alternatively calculate the frequency-domain processing output 342 using the combination processing module 334.

The time processing module 336 is configured to implement the time-domain mechanism 316. The time processing module 336 can calculate, apply, or a combination thereof for the time weight 324.

The time processing module 336 can implement the time-domain mechanism 316 including a time-domain interpolation mechanism or a time-domain analysis mechanism. The time processing module 336 can analyze or process the time component or characteristic of data or signals, such as the receiver signal 128, the frequency-domain processing output 342, or a combination thereof.

The time processing module 336 can calculate the time weight 324 according to the time-domain mechanism 316. The time processing module 336 can calculate the time weight 324 based on the receiver signal 128. For example, the time processing module 336 can calculate the time weight 324 based on the time-correlation function 158, the normalization adjustor 346, or a combination thereof, such as according to:

$$W_l^{TD} = [r_t(l-l_1) \ldots r_t(l-l_n)].$$ Equation (11).

The time weight 324 can be represented as '$W_l^{TD}$'.

The time processing module 336 can calculate the time weight 324 differently or adjust for the frequency-domain processing output 342 based on the combining mechanism 318 instead of the reference processing mechanism 312 and the frequency-domain mechanism 314. The time processing module 336 can calculate the time weight 324 differently or adjust the time weight 324 based on the normalization adjustor 346. For example, the time processing module 336 can calculate the time weight 324 according to:

$$W_l^{TD} = [r_t(l-l_1) \ldots r_t(l-l_n)](R_t + \delta^1 I)^{-1}.$$ Equation (12).

The time processing module 336 can apply the time weight 324 according to the time-domain mechanism 316 for interpolating the communication channel 126 between one or more instances of the reference portion 116. The time processing module 336 can process the data or the information existing in the time domain 152, perform the processing in the time domain 152, or a combination thereof. The time processing module 336 can further interpolate the data corresponding to the resource element 114 between instances of the reference portion 116 that have been smoothed and processed in the frequency domain 150.

The time processing module 336 can apply the time weight 324 to process for the time domain 152, interpolate, or a combination thereof. The time processing module 336 can generate the channel estimate 134 or the estimate element 136 therein based on applying the time weight 324 to the frequency-domain processing output 342. The time processing module 336 can apply the time weight 324 based on:

$$\hat{h}_{k,l} = W_l^{TD} [\hat{h}_{k,l_1}, \hat{h}_{k,l_2}, \ldots, \hat{h}_{k,l_n}]^T.$$ Equation (13).

The channel estimate 134 or the estimate element 136 therein can be represented as '$\hat{h}_{k,l}$'.

The time-domain mechanism 316 can calculate the estimate element 136 corresponding to one or more instances of the resource element 114 according to one or more time slot. For example, the time-domain mechanism 316 can calculate the estimate element 136 for one or more instance of the resource element 114 corresponding to one or more values or instances of the carrier index 122, the frame index 124, or a combination thereof based on the result of processing in the frequency domain 150. As a more specific example, the time-domain mechanism 316 can calculate instances of the estimate element 136 corresponding to a particular instance of the frame index 124 different from the reference portion 116.

It has been discovered that the channel estimate 134 or the estimate element 136 therein based on the reference weight 320, the frequency weight 322, and the time weight 324 corresponding to the reference processing mechanism 312, the frequency-domain mechanism 314, and the time-domain mechanism 316 provide reduction in computational complexity and improved accuracy in estimating the communication channel 126. The modular estimation mechanism 138 utilizing 3 different steps can trade-off slight expansion in non-dominant process for fully manipulating the pilot symbols to reduce the complexity in the dominant process overall.

It has further been discovered that the channel estimate 134 or the estimate element 136 therein based on the frequency-adjusted weight 326 and the time weight 324 corresponding to the combining mechanism 318 and the time-domain mechanism 316 provide reduction in computational complexity and improved accuracy in estimating the communication channel 126. The modular estimation mechanism 138 utilizing 2 different steps can trade-off slight expansion in non-dominant process for fully manipulating the pilot symbols to reduce the complexity in the dominant process overall.

It has further been discovered that the channel estimate 134 or the estimate element 136 therein generated without the residual error 148 provide increased accuracy in estimating the communication channel 126 while reducing computational complexity. The modular estimation mechanism 138 as described above can eliminate calculation of additional parameter of the residual error 148. The modular estimation mechanism 138 can utilize the noise measure 130 without further evaluating an error introduced within the processing to characterize the communication channel 126.

It has further been discovered that the channel estimate 134 or the estimate element 136 therein generated with the modular estimation mechanism 138 instead of the naïve-comprehensive mechanism 140 provide reduction in number of computations or iterations. The modular estimation mechanism 138 using the staged calculation can reduce the overall number of multiplications required for generating the channel estimate 134 or the estimate element 136 therein compared to the naïve-comprehensive mechanism 140 calculating 2 dimensional MMSE channel estimate using a comprehensive approach according to $$\underbrace{`R_{h_k,l}p(R_{pp}+\sigma^2 I)^{-1}}_{\text{(2D MMSE weight matrix)}}y\text{'}.$$

The staged calculations can reduce the compounded effect from manipulating large sets of data for complex computations by simplifying the computation, reducing the size of the data, or a combination thereof.

It has further been discovered that the channel estimate 134 or the estimate element 136 therein generated based on the normalization adjustor 346 provides increased accuracy in estimating the communication channel 126 while reducing computational complexity. The normalization adjustor 346 can simplify the values for computation and control the processing appropriately at each step or stage in generating the channel estimate 134 or the estimate element 136.

After estimating the communication channel 126, the control flow can be passed from the channel estimation module 304 to the message processing module 306. The control flow can pass similarly as described above between the receiver module 302 and the channel estimation module 304 but using processing results of the channel estimation module 304, such as the channel estimate 134.

The message processing module 306 is configured to process for the serving content 110. The message processing module 306 can detect, decode, or a combination thereof for the receiver signal 128 to recognize, recover, or estimate the serving signal 108, the serving content 110, or a combination thereof from the receiver signal 128 based on the channel estimate 134.

For example, the message processing module 306 can calculate likelihood values, such as logarithmic likelihood ratio (LLR), for a portion of the receiver signal 128 corresponding to one or more of the symbols, bits, or a combination thereof transmitted for the serving signal 108 based on the channel estimate 134. Also for example, the message processing module 306 can calculate LLR for bits or code word corresponding to the serving signal 108 or the serving content 110 intended for communication based on the channel estimate 134. Also for example, the message processing module 306 can implement error check or content verification, error correction, for the information processed from the receiver signal 128.

The message processing module 306 can use iterative configurations, such as for iterative detection-decoding configuration or successive cancelling configuration to process for or recover the serving content 110. The message processing module 306 can further use interference-aware processing mechanism to process for or recover the serving content 110.

The message processing module 306 can use the serving content 110 recovered or estimated from the receiver signal 128 based on the channel estimate 134. The computing system 100 can communicate the recovered or estimated instance of the serving content 110 to the user, to another device, or a combination thereof.

For example, the first device 102 can display, audibly recreate, cause haptic feedback, or a combination thereof according to the serving content 110 for communicating to the user. Also for example, the first device 102 can further process, transmit, relay, or a combination thereof to communicate with another device. Also for example, the first device 102 can implement the serving content 110, such as for configuration, data storage, instruction execution, or a combination thereof.

The message processing module 306 can use the first communication unit 216, the second communication unit 236, the first control unit 212, the second control unit 234, or a combination thereof to process for the serving content 110. The message processing module 306 can store the processing results, such as the serving content 110, in the first communication unit 216, the second communication unit 236, the first storage unit 214, the second storage unit 246, or a combination thereof.

Figure 4:
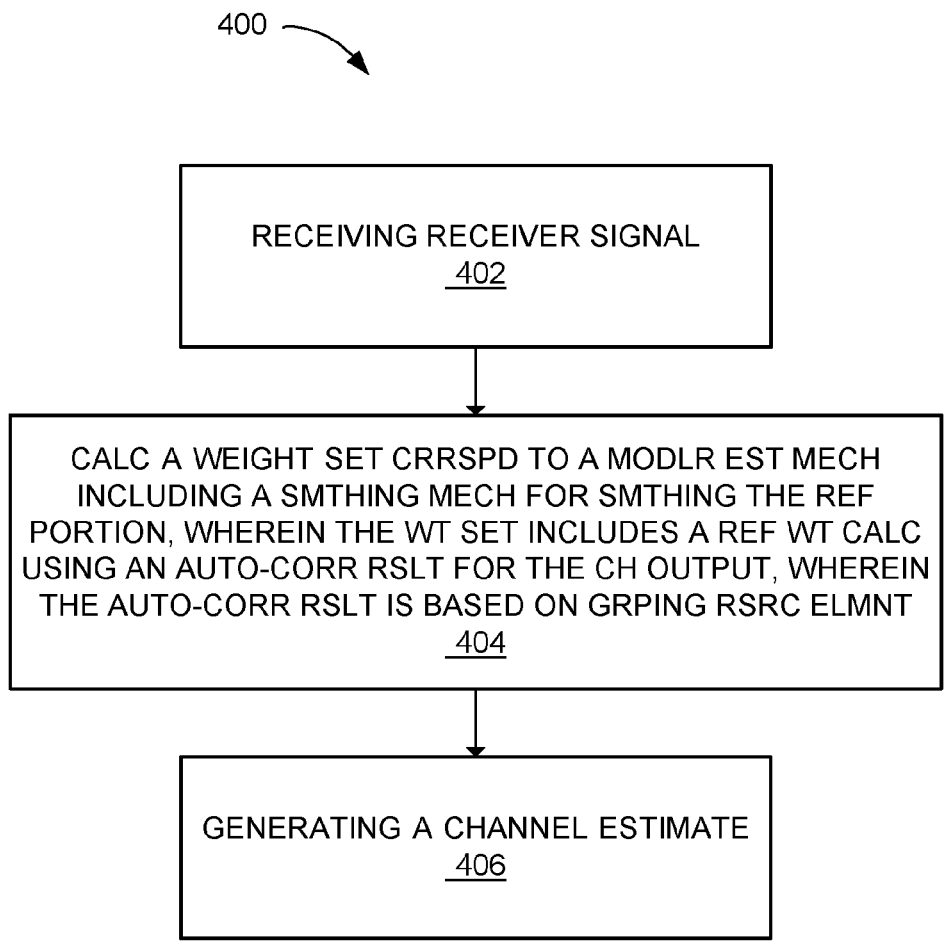
FIG. 4 is a flow chart of a method of operation of a computing system in a further embodiment.

Referring now to FIG. 4, therein is shown a flow chart 400 of a method of operation of a computing system in a further embodiment. The method 400 includes: receiving receiver signal for communicating serving content through a communication channel in a block 402; calculating a weighting set corresponding to a modular estimation mechanism including a smoothing mechanism for smoothing the reference portions wherein the weighting set includes a reference weight calculated using an auto-correlation result for the channel output portion, wherein the auto-correlation result is based on grouping resource elements within the channel output portion according to a common symbol index in a block 404; and generating a channel estimate set with a communication unit based on the weighting set for characterizing the communication channel for recovering the serving content in a block 406.

The modules described in this application can be hardware implementation or hardware accelerators, including passive circuitry, active circuitry, or both, in the first communication unit 216 of FIG. 2, the second communication unit 236 of FIG. 2, the first control unit 212 of FIG. 2, the second control unit 238 of FIG. 2, or a combination thereof. The modules can also be hardware implementation or hardware accelerators, including passive circuitry, active circuitry, or both, within the first device 102 of FIG. 1, the second device 106 of FIG. 1, or a combination thereof but outside of the first communication unit 216, the second communication unit 236, the first control unit 212, the second control unit 234, or a combination thereof.

The computing system 100 of FIG. 1 has been described with module functions or order as an example. The computing system 100 can partition the modules differently or order the modules differently. For example, the channel estimation module 304 of FIG. 3 and the receiver module 302 of FIG. 3 can be combined. Also for example, the calculation for the weighting set 160 of FIG. 1 in the reference processing module 330 of FIG. 3, the frequency processing module 332 of FIG. 3, the combination processing module 334 of FIG. 3, the time processing module 336 of FIG. 3, or a combination thereof can be separated into one or a group of modules.

For illustrative purposes, the various modules have been described as being specific to the first device 102, the second device 106, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first communication unit 216, the second communication unit 236, the first control unit 212, the second control unit 234, or a combination thereof can represent the non-transitory computer readable medium. The first communication unit 216, the second communication unit 236, the first control unit 212, the second control unit 234, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation of the channel estimate 134 of FIG. 1 results in the movement in the physical world, such as content displayed or recreated for the user on the first device 102 from processing the serving content 110 of FIG. 1 therein. The content reproduced on the first device 102, such as navigation information or voice signal of a caller, can influence the user's movement, such as following the navigation information or replying back to the caller. Movement in the physical world results in changes to the geographic location of the first device 102 and correspondingly to the communication channel 126 of FIG. 1, which can be fed back into the computing system 100 and influence the channel estimate 134.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another aspect of an embodiment described herein is that it valuably supports and services the historical trend of reducing costs, simplifying systems, and increasing performance.

These and other valuable aspects of an embodiment consequently further the state of the technology to at least the next level.

While the embodiments have been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
an inter-device interface configured to receive a receiver signal for communicating serving content through a communication channel, the receiver signal including a channel output portion with reference portions;
a communication unit, coupled to the inter-device interface, configured to:
calculate a weighting set corresponding to a modular estimation mechanism including a smoothing mechanism for smoothing the reference portions,
wherein the weighting set includes a reference weight calculated using an auto-correlation result for the channel output portion, wherein the auto-correlation result is based on grouping resource elements within the channel output portion according to a common symbol index, and
generate a channel estimate based on the weighting set for characterizing the communication channel for recovering the serving content.

2. The system as claimed in claim 1 wherein the communication unit is configured to:
calculate the weighting set according to the modular estimation mechanism including a reference processing mechanism, a frequency-domain mechanism, and a time-domain mechanism; and
generate the channel estimate based on the reference processing mechanism, the frequency-domain mechanism, and the time-domain mechanism.

3. The system as claimed in claim 1 wherein the communication unit is configured to:
calculate the weighting set according to the modular estimation mechanism including a combining mechanism and a time-domain mechanism; and
generate the channel estimate based on the combining mechanism and the time-domain mechanism.

4. The system as claimed in claim 1 wherein the communication unit is configured to generate the channel estimate for estimating the communication channel without using residual error.

5. The system as claimed in claim 1 wherein the communication unit is configured to generate the channel estimate based on the modular estimation mechanism including process implementation count greater than one.

6. The system as claimed in claim 1 wherein the communication unit is configured to generate the channel estimate based on the modular estimation mechanism for replacing a naïve-comprehensive mechanism.

7. The system as claimed in claim 6 wherein:
the communication unit is configured to:
calculate the weighting set including a frequency weight, and a time weight according to the modular estimation mechanism including a frequency-domain mechanism, and a time-domain mechanism;
generate the channel estimate based on:
applying the reference weight according to the smoothing mechanism for smoothing the reference portions,
applying the frequency weight according to the frequency-domain mechanism for characterizing the communication channel corresponding to the reference portions, and
applying the time weight according to the time-domain mechanism for interpolating the communication channel between the reference portions.

8. The system as claimed in claim 6 wherein the communication unit is configured to:
calculate the weighting set including a frequency-adjusted weight calculated based on a normalization adjustor according to the modular estimation mechanism including a combining mechanism;

generate the channel estimate based on applying the frequency-adjusted weight according to the combining mechanism for combining a reference processing mechanism and a frequency-domain mechanism into a process implementation count of one.

9. The system as claimed in claim 6 wherein the communication unit is configured to:
calculate a reference processing output based on applying the reference weight to the receiver signal;
calculate a frequency-domain processing output based on applying a frequency weight to the reference processing output for processing in a frequency domain; and
generate the channel estimate based on applying a time weight to the frequency-domain processing output for processing in a time domain.

10. The system as claimed in claim 6 wherein:
the communication unit is configured to:
calculate a frequency-domain processing output based on applying a frequency-adjusted weight to the receiver signal for smoothing the reference portions and processing in a frequency domain; and
generate the channel estimate based on applying a time weight to the frequency-domain processing output for processing in a time domain.

11. A method of operation of a computing system comprising:
receiving a receiver signal for communicating serving content through a communication channel, the receiver signal including a channel output portion with reference portions;
calculating a weighting set corresponding to a modular estimation mechanism including a smoothing mechanism for smoothing the reference portions,
wherein the weighting set includes a reference weight calculated using an auto-correlation result for the channel output portion, wherein the auto-correlation result is based on grouping resource elements within the channel output portion according to a common symbol index; and
generating a channel estimate with a communication unit based on the weighting set for characterizing the communication channel for recovering the serving content.

12. The method as claimed in claim 11 wherein:
calculating the weighting set includes calculating the weighting set according to the modular estimation mechanism including a reference processing mechanism, a frequency-domain mechanism, and a time-domain mechanism; and
generating the channel estimate includes generating the channel estimate based on the reference processing mechanism, the frequency-domain mechanism, and the time-domain mechanism.

13. The method as claimed in claim 11 wherein:
calculating the weighting set includes calculating the weighting set according to the modular estimation mechanism including a combining mechanism and a time-domain mechanism; and
generating the channel estimate includes generating the channel estimate based on the combining mechanism and the time-domain mechanism.

14. The method as claimed in claim 11 wherein generating the channel estimate includes generating the channel estimate for estimating the communication channel without using residual error.

15. The method as claimed in claim 11 wherein generating the channel estimate includes generating the channel estimate based on the modular estimation mechanism including process implementation count greater than one.

16. A non-transitory computer readable medium including instructions that when executed by a computing system performs a method comprising:
receiving a receiver signal for communicating serving content through a communication channel, the receiver signal including a channel output portion with reference portions;
calculating a weighting set corresponding to a modular estimation mechanism including a smoothing mechanism for smoothing the reference portions,
wherein the weighting set includes a reference weight calculated using an auto-correlation result for the channel output portion, wherein the auto-correlation result is based on grouping resource elements within the channel output portion according to a common symbol index; and
generating a channel estimate with a communication unit based on the weighting set for characterizing the communication channel for recovering the serving content.

17. The non-transitory computer readable medium as claimed in claim 16 wherein:
calculating the weighting set includes calculating the weighting set according to the modular estimation mechanism including a reference processing mechanism, a frequency-domain mechanism, and a time-domain mechanism; and
generating the channel estimate includes generating the channel estimate based on the reference processing mechanism, the frequency-domain mechanism, and the time-domain mechanism.

18. The non-transitory computer readable medium as claimed in claim 16 wherein:
calculating the weighting set includes calculating the weighting set according to the modular estimation mechanism including a combining mechanism and a time-domain mechanism; and
generating the channel estimate includes generating the channel estimate based on the combining mechanism and the time-domain mechanism.

19. The non-transitory computer readable medium as claimed in claim 16 wherein generating the channel estimate includes generating the channel estimate for estimating the communication channel without using residual error.

20. The non-transitory computer readable medium as claimed in claim 16 wherein generating the channel estimate includes generating the channel estimate based on the modular estimation mechanism including process implementation count greater than one.

* * * * *